United States Patent Office 3,206,185
Patented Sept. 14, 1965

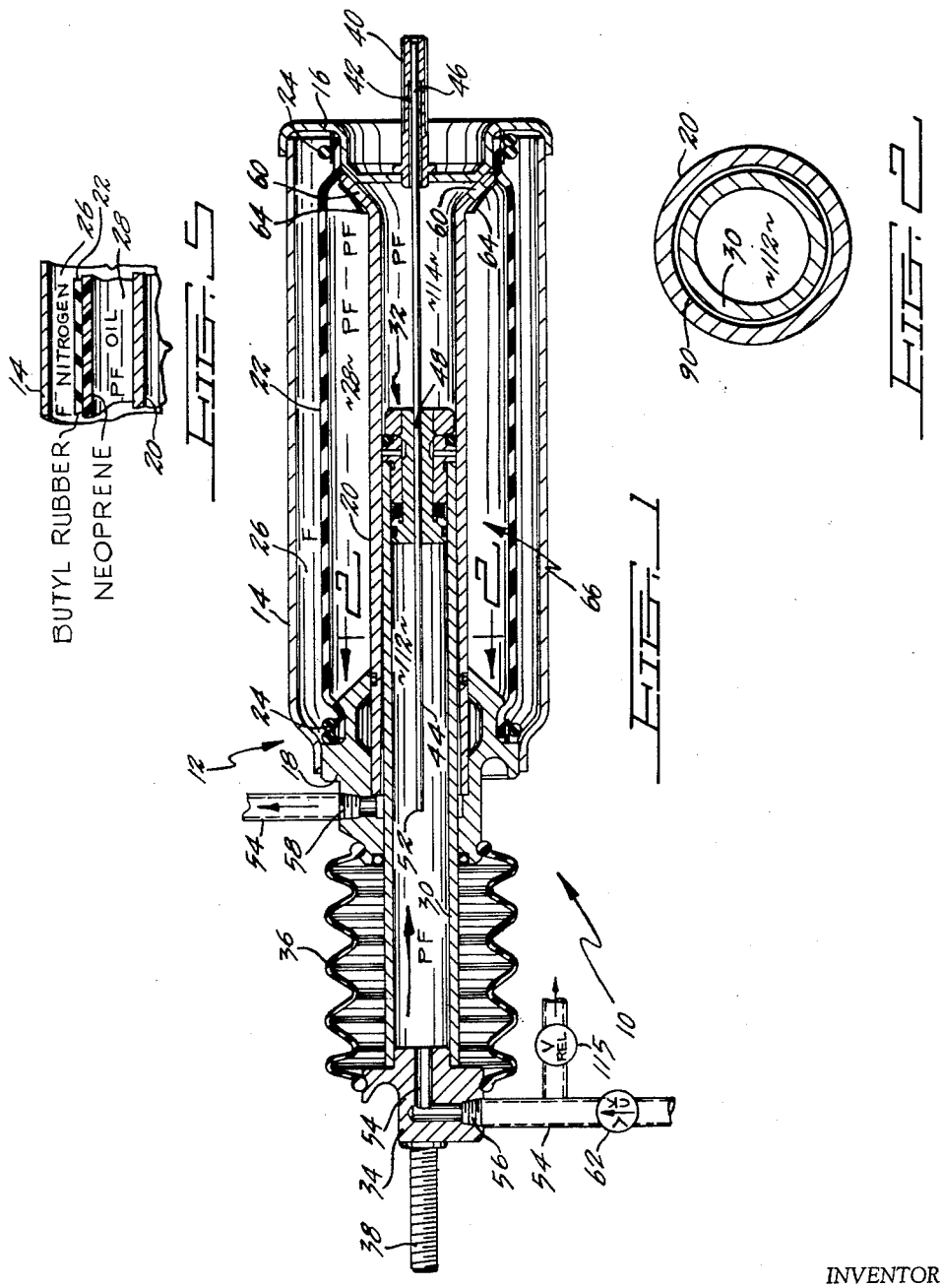

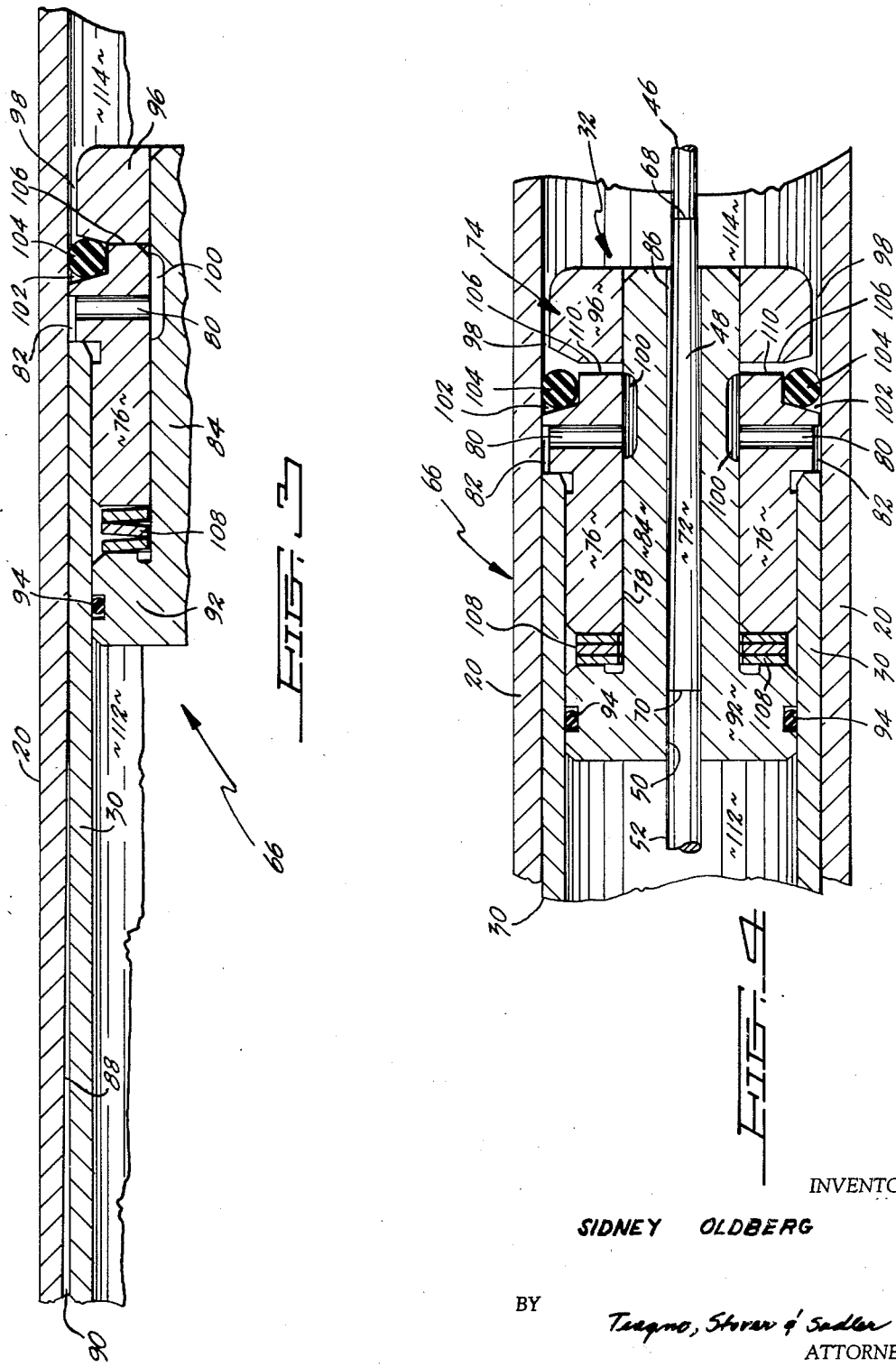

3,206,185
SUSPENSION SYSTEM AND APPARATUS FOR SUPPORTING A STRUCTURE
Sidney Oldberg, Birmingham, Mich., assignor to Eaton Manufacturing Company, Cleveland, Ohio, a corporation of Ohio
Filed Oct. 16, 1962, Ser. No. 230,933
24 Claims. (Cl. 267—64)

This invention relates to an improved suspension system and apparatus for supporting a structure and more particularly to means for variably controlling the volume of a high pressure fluid of a hydro-pneumatic type suspension system wherein the high pressure fluid flows in a closed circuit with the volume of the high pressure fluid acting on an entrapped volume of a compressible fluid to effectively improve the suspension characteristics of the system and apparatus during the operative cycle thereof and for sealing the high pressure fluid against fluid flow in the closed circuit during a static condition of the system and apparatus.

It is an object of this invention to provide a suspension system and apparatus wherein there is employed an entrapped volume of compressible fluid which may be acted on by a volume of high pressure fluid having a flow path through intake, working and exhause phases of a closed circuit with means for varying the inlet and discharge flow rate of the high pressure fluid in a manner which will vary the volume of the high pressure fluid which may be acting on the compressible fluid during the operating cycle of the system and apparatus.

It is also an object of this invention to provide a suspension system and apparatus of the hydro-pneumatic type wherein there is employed a tube-like member having a piston rod and a piston head movably mounted therein, and an entrapped volume of compressible fluid which may be acted on by a volume of high pressure fluid having a flow path through intake, working and exhause phases of a closed circuit with means for varying the inlet and discharge flow rate of the high pressure fluid in a manner which will vary the volume of the high pressure fluid which may be acting on the compressible fluid during the operating cycle of the system and apparatus, such means being in the form of an elongated metering rod having a surface which converges and tapers in a direction downstream of the high pressure fluid flow to define a variable space between a smooth bore in the piston head which is disposed between the intake and working phases of the closed circuit as well as a tapering surface on the tube-like member which diverges from the piston rod in a direction upstream relative to the fluid flow of the high pressure fluid to define a variable space or clearance between the working and the exhaust phases of the closed circuit.

Another object of this invention is to provide a suspension system and apparatus wherein an entrapped volume of a compressible fluid is acted on by a volume of high pressure fluid which flows through a closed circuit having intake, working and exhaust phases with means for sealing the fluid flow of the high pressure fluid between the working and exhaust phases of the closed circuit during a static condition of the system and apparatus.

Yet another object of this invention is to provide a suspension system and apparatus of the hydro-pneumatic type including a piston rod and wherein an entrapped volume of a compressible fluid is acted on by a volume of high pressure fluid which flows through a closed circuit having intake, working and exhaust phases with means for sealing the fluid flow of the high pressure fluid between the working and exhaust phases of the closed circuit during a static condition of the system and apparatus, such means being in the form of a sleeve supported by the piston rod and having a member mounted thereon for movement relative thereto, a deformable sealing structure interposed between the movable member and the sleeve with the movable member being engageable with the deformable sealing structure to seal the fluid flow of the high pressure fluid between the working and the exhaust phases of the closed circuit during a static condition of the system and apparatus, and a bias normally urging the member in an upstream direction in engagement with the deformable sealing structure.

Still another object of this invention is to provide a suspension system and apparatus of the hydro-pneumatic type which includes a piston rod and wherein an entrapped volume of a compressible fluid is acted on by a volume of high pressure fluid which flows through a closed circuit having intake, working and exhaust phases with means for sealing the fluid flow of the high pressure fluid between the working and exhaust phases of the closed circuit during a static condition of the system and apparatus, such means being in the form of a sleeve supported by the piston rod and having a member mounted thereon for movement relative thereto, a deformable sealing structure interposed between the movable member and the sleeve with the movable member being engageable with the deformable sealing structure to seal the fluid flow of the high pressure fluid between the working and exhaust phases of the closed circuit during a static condition of the system and apparatus, a bias normally urging the member in an upstream direction in engagement with the deformable sealing structure with the upstream end portion of the member defining a surface against which the high pressure fluid may act to overcome the force of the bias and cause the member to disengage the deformable sealing structure and place the exhaust phase of the closed circuit in communication with the work phase thereof during the operating cycle of the system and apparatus.

An additional object of this invention is to provide a suspension system and apparatus wherein an entrapped volume of a compressible fluid is acted on by a volume of high pressure fluid which flows through a closed circuit having intake, working and exhaust phases with means for varying the volume of the high pressure fluid during the flow thereof through the closed circuit in a manner to vary the volume thereof which may act on the compressible fluid during the operating cycle of the system and apparatus and for defining a seal against the fluid flow of the high pressure fluid between the working and the exhaust phases of the closed circuit during a static condition of the system and apparatus.

Still another additional object of this invention is to provide a suspension system and apparatus of the hydro-pneumatic type wherein there is employed a tube-like member having a piston rod and piston head movable therein, and an entrapped volume of compressible fluid which may be acted on by a volume of high pressure fluid having a flow path through intake, working and exhaust phases of a closed circuit with means for varying the volume of the high pressure fluid during the intake and discharge flow thereof through the closed circuit in response to the position of the piston rod in a manner to vary the volume of the high pressure fluid which may act on the compressible fluid during the operating cycle of the system and apparatus and for defining a seal against the fluid flow of the high pressure fluid between the working and the exhaust phases of the closed circuit during a static condition of the system and apparatus, such means being in the form of an elongated metering rod having a surface which converges and tapers in a direction downstream of the high pressure fluid flow to define a variable space between a smooth bore in the piston head which is disposed between the intake and working phases of the closed circuit as well as a tapering surface on the tube-like member which diverges from the piston rod in a direction upstream relative to the fluid flow of the high pressure fluid to define a variable space or clearance between the working and the exhaust phases of the closed circuit, and a sleeve supported by the piston rod with the sleeve having a member mounted thereon for movement relative thereto, a deformable sealing structure interposed between the movable member and the sleeve with the movable member being engageable with the deformable sealing structure to seal the fluid flow of the high pressure fluid between the working and exhaust phases of the closed circuit during the static condition of the system and apparatus, and a bias normally urging the member in an upstream direction in engagement with the deformable sealing structure with the upstream end portion of the member defining a surface against which the high pressure fluid may act to overcome the force of the bias and cause the deformable sealing structure to be disengaged and place the exhaust phase of the closed circuit in communication with the work phase thereof during the operating cycle of the system and apparatus.

It is also a principal object of this invention to provide a suspension system and apparatus of the hydro-pneumatic type wherein there is employed a chamber having an entrapped volume of compressible fluid which may be acted on by a volume of high pressure fluid having a flow path through intake, working and exhaust phases of a closed circuit with a resilient substantially impervious diaphragm disposed between the chamber and the working phase of the closed circuit with the diaphragm being formed of neoprene and the compressible fluid which is confined within the chamber including Freon 14.

Yet another principal object of this invention is to provide a suspension system and apparatus of the hydro-pneumatic type wherein there is employed a chamber having an entrapped volume of compressible fluid which may be acted on by a volume of high pressure fluid having a flow path through intake, working and exhaust phases of a closed circuit with a resilient substantially impervious diaphragm disposed between the chamber and the working phase of the closed circuit with the diaphragm being formed of a layer of butyl rubber bonded to a layer of neoprene and the compressible fluid which is confined within the first chamber includes nitrogen gas.

In order to accomplish the objects as stated above, wherein there is employed a hydro-pneumatic suspension system and apparatus for supporting or suspending a structure through an extensible and retractable apparatus having a plurality of chambers with one of the chambers being sealed and having a compressible fluid confined therein and another one of the chambers having a high pressure fluid passing therethrough in a closed circuit having intake, working and exhaust phases with a deformable impervious resilient diaphragm being disposed between the chambers and a movable piston acting on the high pressure fluid, there is provided means for varying the intake and exhaust flow rate of the high pressure fluid in a manner which varies the volume thereof which may act on the compressible fluid in the one chamber through the deformable resilient substantially impervious diaphragm with the flow rates of the intake and exhaust phases of the high pressure fluid being responsive to the position of the piston during the operating cycle of the system and apparatus with the means also acting during a static condition of the system and apparatus to seal the fluid flow of the high pressure fluid between the intake and exhaust phases of the closed circuit. The means may take the form of a variable clearance or spacing which is located between the intake and the working phases of the closed circuit to vary the flow of the high pressure fluid between the intake and the working phases of the closed circuit and a variable clearance or spacing between the working and the exhaust phases of the closed circuit to vary the fluid flow of the high pressure fluid therebetween during the operating cycle of the system and apparatus. The variable spacings or clearances are defined by tapering surface areas which are disposed intermediate the piston head of the piston and a metering rod and between the piston rod of the piston and the adjacent part of the apparatus in which the piston operates. In this way, the respective spaces or clearances affect the volume of the high pressure fluid which may pass therethrough during the intake and the discharge fluid flow thereof in the closed circuit with the ratio of the intake and discharge fluid flow being controlled according to desired ratios in response to the position of the piston within the confines of the apparatus since the discharge flow of the closed circuit is controlled by the variable space or clearance between the piston rod and the adjacent part of the apparatus while the intake flow of the high pressure fluid is controlled by the variable clearance or spacing between the piston head and the metering rod. The means also includes a device carried by the piston head which normally seals off the fluid flow of the high pressure fluid between the working phase and the exhaust phase of the closed circuit. The device may take the form of a member which is movable relative to the piston rod and piston head between the sealing and a nonsealing position with a bias being provided for normally urging the member into the sealing position so that when the system and apparatus is in a static condition the fluid flow of the high pressure fluid will be sealed between the working and exhaust phases of the closed circuit but during the operating cycle of the system and apparatus the high pressure fluid will act on the member to move same into the nonsealing position by overcoming the force created by the bias and place the exhaust phase of the closed circuit in communication with the working phase thereof.

Other objects, advantages and important features of the invention will be apparent from a study of the specification following, taken with the drawing, which together describe, disclose and illustrate certain embodiments or modifications of the invention and what is now considered to be the best mode of practicing the principles thereof. Still other embodiments or modifications may be suggested to those having the benefit of the teachings therein and such other embodiments or modifications are intended to be reserved especially as they fall within the scope and breadth of the subjoined claims.

In the drawing:

FIGURE 1 is a longitudinal sectional view of apparatus employed in a hydro-pneumatic type suspension system illustrating the apparatus in a normal condition and showing means for varying the inlet and discharge flow rate of a high pressure fluid through a closed circuit in a manner to vary the volume thereof which may act on a compressible fluid during the operating cycle of the system and apparatus and for sealing the fluid flow of the high pressure fluid during a static condition of the system and apparatus;

FIGURE 2 is a transverse sectional view taken along the line 2—2 of FIGURE 1 looking in the direction of the arrows and illustrating a part of the means as shown therein;

FIGURE 3 is a partial enlarged longitudinal sectional view of the apparatus illustrated in FIGURE 1 showing the means wherein another part thereof defines a seal against the fluid flow of the high pressure fluid through the closed circuit;

FIGURE 4 is a partial enlarged longitudinal sectional view similar to FIGURE 3 of the drawing but illustrating another part of the means in nonsealing relationship for enabling the high pressure fluid to have the desired fluid flow through the closed circuit, and FIGURE 5 is a partial longitudinal sectional view illustrating one embodiment of still another part of the apparatus of this invention.

Attention is now directed to FIGURE 1 of the drawing wherein there is illustrated an elongated longitudinally extensible and retractable apparatus 10 of an improved closed circuit type of hydro-pneumatic suspension system wherein an entrapped volume of a compressible fluid F, such as air, Freon, nitrogen or the like, may be acted on by a variable volume of high pressure fluid PF, such as oil or the like, in a manner which effectively increases the suspension properties of the apparatus 10 while supporting a vehicle, not illustrated, or some other like type of structure, as desired.

The apparatus 10 includes a housing assembly 12 comprised of an outer substantially cylindrical tube-like member 14, a lower end cap element 16 which may be connected by any suitable means to one end portion of the outer tube-like member 14, an intermediate cap element 18 which may be connected by any suitable means to the other end portion of the outer tube-like member 14, and an inner substantially cylindrical tube-like member 20 which is secured to and extends between the lower 16 and the intermediate 18 cap elements in generally concentric relationship relative to the outer tube-like member 14. A substantially cylindrical bodily flexible diaphragm 22 formed of a resilient impervious material extends between the lower 16 and the intermediate 18 cap elements and is connected respectively thereto by suitable sealing sleeves 24, which may be formed of butyl rubber or the like, to define a sealed outer chamber 26 wherein there may be entrapped a volume of the compressible fluid F and a pressure inner chamber 28 for receiving a variable volume of the high pressure fluid PF in a manner to be described and disclosed in more detail hereinafter.

The material from which the diaphragm 22 is formed should have characteristics and properties which will not allow either the compressible fluid F or the high pressure fluid PF to permeate the diaphragm 22 and thus allow leakage through or the destruction of the diaphragm 22. In actual practice, it has been found that the total loss of the compressible fluid F may be reduced to a minimum while the service life of the diaphragm 22 is extended to a maximum if the diaphragm 22 is formed of neoprene and the compressible fluid F is Freon 14. The desired results acquired from employing Freon 14 as the compressible fluid F and by forming the diaphragm 22 of neoprene is due to the large molecules associated with Freon 14 which results in an extremely low permeation and diffusion rate.

It has also been found, and as illustrated in FIGURE 5 of the drawing, that if the diaphragm 22 is formed of a neoprene layer having bonded thereto a butyl rubber layer with the compressible fluid F being nitrogen, that by reason of the fact that neoprene is oil resistant and butyl rubber is highly resistant to permeation by nitrogen, that the desired results will also be acquired.

An elongated hollow substantially cylindrical piston rod 30 is movably mounted for reciprocating motion within the confines of the inner tube-like member 20 of the apparatus 10. A piston head 32 is carried by the inner end portion of the piston rod 30 and an upper end cap element 34 is secured to the outer end portion thereof and a suitable bodily flexible boot 36, preferably formed from neoprene, is secured to and extends between the intermediate 18 and the upper 34 cap elements to enclose the outer end portion of the piston rod 30.

The upper end cap element 34 may be provided with an externally threaded outwardly projecting elongated upper mount 38 for connecting the apparatus 10 to structure such as a vehicle frame, not illustrated, and an externally threaded outwardly projecting elongated lower mount 40 having a longitudinally extending recess 42 therein may be secured to the lower cap element 16 for connecting the apparatus 10 to structure such as a vehicle axle housing, not illustrated.

An elongated metering rod 44 having one end portion 46 thereof secured within the recess 42 in the lower mount 40 with the metering rod 44 projecting therefrom and having the intermediate portion 48 thereof passing through a piston head bore 50 (FIGURE 4) which is longitudinally aligned with the recess 42 and the metering rod 44 terminates with the other end portion 52 thereof being disposed within the hollow of the piston rod 30.

Suitable conduits 54 are provided for the flow path, as shown by the arrows in FIGURE 1 of the drawing, of the high pressure fluid PF to define a closed circuit having intake, working and exhaust phases for the system and the apparatus 10. The upper end cap element 34 is provided with a high pressure fluid intake port 56 and the intermediate cap element 18 is provided with a high pressure fluid discharge port 58. The flow path of the high pressure fluid PF also passes through a plurality of circumferentially spaced apertures 60 disposed in the wall portion of the inner tube-like member 20. Suitable valving may be provided for the conduits 54 to control the flow stream of the high pressure fluid PF and as illustrated in FIGURE 1 of the drawing such valving may take the form of a check valve structure 62 in the conduits 54 to the upstream side of the intake port 56 and anti-extrusion valves 64, preferably formed from S.A.E. 1090 steel, for each of the apertures 60 in the inner tube-like member 20.

The apparatus 10 further includes means 66 for simultaneously varying the amount of inlet and discharge fluid flow of the high pressure fluid PF between the intake and the working phases and the working and the exhaust phases, respectively, of the closed circuit, during the operating cycle of the system and the appaartus 10 so that the volume of high pressure fluid PF which may act on the compressible fluid F may be varied according to and in response to the position of the piston rod 30 within the confines of the inner tube-like member 20, and for sealing the fluid flow of the high pressure fluid PF between the working and the exhaust phases of the closed circuit during a static condition of the system and the apparatus 10.

Attention is now directed to FIGURES 2, 3, and 4 of the drawing wherein the means 66 is illustrated and it is to be noted that the metering rod 44 does not have a constant dimension throughout the longitudinal length thereof and that the metering rod 44 diverges outwardly from a location 68 which is adjacent the one end portion 46 of the metering rod 44 to a location 70 which is adjacent to the other end portion 52 thereof. In this manner, the intermediate portion 48 defines a smooth tapering surface 72 which converges from the location 70 toward the location 68 on the metering rod 44 in a direction which is downstream relative to the fluid flow of the high pressure fluid PF and away from the surface of the piston head bore 50.

In actual practice, it has been found advantageous that the dimension of the metering rod 44 at the location 68 thereon be .120 inch in diameter with the location 70 having a dimension of .125 inch in diameter with the surface 72 being approximately two inches in length and having a taper of .005 inch.

The means 66 further includes a device 74 on the piston head 32 for enabling the high pressure fluid PF to pass along the desired flow stream through the closed circuit during the operating cycle of the system and the apparatus 10 and for creating a hydraulic lock seal against such flow stream during a static condition of the system and the apparatus 10.

The device 74 includes a piston rod end sleeve 76 secured to the inner end portion of the piston rod 30. The piston rod end sleeve 76 has a longitudinally extending bore 78, a plurality of circumferentially spaced radially disposed passageways 80 extending from the bore 78 and terminating in a circumferentially extending annular recess 82 formed in the outer peripheral edge portion of the piston rod end sleeve 76.

The device 74 further includes an elongated piston member 84 slidably mounted within the bore 78 of the piston rod end sleeve 76 for movement relative thereto as well as relative to the piston rod 30. The piston member 84 is provided with the longitudinally extending substantially smooth piston head bore 50 which in actual practice has a diameter of .126 inch which gives a minimum clearance of a thousandth of an inch between the location 70 on the metering rod 44 and a maximum clearance of approximately five thousandths of an inch between the location 68 on the metering rod 44 so that there is defined a variable space or clearance 86, as shown in exaggerated form in FIGURE 4 of the drawing, through which the high pressure fluid PF may pass from the intake phase on the upstream side of the piston head 32 to the working phase on the downstream side of the piston head 32.

Still further, and attention is now directed to FIGURE 1 of the drawing, the inner tube-like member 20 has a continuous bore of constant dimension from a location thereon which is approximately at the longitudinal midportion thereof in a direction toward the downstream flow path of the high pressure fluid PF toward the lower cap element 16 and the lower mount 40, i.e., toward the right of the apparatus 10 as viewed in FIGURE 1 of the drawing. However, it is to be noted that the part of the inner tube-like member 20 to the opposite direction; that is, toward the upstream side of the flow path of the high pressure fluid PF and toward the intermediate cap element 18, i.e., to the left as viewed in FIGURE 1 of the drawing, flares outwardly with the wall portion thereof diverging away in a tapering surface 88 from the surface of the adjacent wall portion of the piston rod 30 to define therewith a variable space or clearance 90 therebetween, illustrated in exaggerated form in FIGURE 3 of the drawing, which also is a part of the means, previously mentioned.

The variable space or clearance 90 provides communication between the working phase of the closed circuit and the exhaust phase thereof in a manner which is to be explained, described and disclosed hereinafter.

It should also be noted that both of the variable spacings or clearances 86 and 90 are simultaneously respectively controlled by the position of the piston head 32 relative to the metering rod 44 and the piston rod 30 relative to the inner tube-like member 20 so that movement of the piston rod 30 and piston head 32 in response to the structure which is suspended or supported by the apparatus 10 will enlarge the size of one of the variable spacings or clearances 86 or 90 while simultaneously holding the size of the other clearance constant or decreasing the size thereof and will accordingly vary the intake and the exhaust fluid flow of the high pressure fluid PF so that the volume of the high pressure fluid PF which may act on the compressible fluid F may be varied, as required.

The piston member 84 is also provided with an enlarged end portion 92 which is disposed within the hollow of the piston rod 30 in spaced relationship to the adjacent portion of the piston rod end sleeve 76. Suitable sealing means 94 is provided between the outer peripheral edge portion of the enlarged end portion 92 of the piston member 84 and the adjacent wall portion of the piston rod 30. The piston member 84 projects through the bore 78 of the piston rod end sleeve 76 beyond the end portion thereof and a generally radially extending piston head end member 96 is secured thereto. It is to be noted that the piston head end member 96 has a cross sectional area smaller than the cross sectional area of the opening in the inner tube-like member 20 which defines a space or clearance 98 therebetween. Intermediate the enlarged end portion 92 and the piston head end member 96, the piston member 84 is provided with an annular recess 100 which is in communication with the passageways 80 of the piston rod end sleeve 76.

A circumferentially extending annular recess 102 is provided in the outer end portion of the piston rod end sleeve 76 and deformable resilient sealing structure 104 in the form of an O-ring member, or the like, is disposed therein with the adjacent portion of the piston head end member 96 defining a surface 106 for engaging the O-ring member 104 in a manner to deform same as will be explained, described and disclosed in more detail hereinafter.

Intermediate the inner enlarged end portion 92 and the adjacent end portion of the piston rod end sleeve 76, there is provided a bias 108 in the form of a plurality of Bellville washers which normally urge the piston member 84 toward the left as viewed in FIGURES 1, 3, and 4 of the drawing, i.e., in a direction which is upstream relative to the flow path of the high pressure fluid PF, so that the surface 106 of the piston head end member 96 will engage the O-ring member 104 and deform same to close off and seal the space or clearance 98 and prevent fluid flow of the high pressure fluid PF from the working phase of the closed circuit to the downstream side of the piston head 32 through the space or clearance 98, the recess 100, the passageways 80 and the recess 82 to the variable space or clearance 90 and the exhaust phase of the closed circuit.

In FIGURE 3 of the drawing, the device 74 is illustrated as being in the sealing position whereat the fluid flow path of the high pressure fluid PF through the closed circuit is closed by reason of the O-ring member 104 which is deformed to close the space or clearance 98 during a static condition of the system and the apparatus 10. The check valve structure 62 which is located to the upstream side of the intake port 56 is effective to prevent the high pressure fluid PF from returning through the conduits 54 during such static condition of the system and the apparatus 10.

However, on an increase in the pressure of the high pressure fluid PF on the upstream side of the piston head 32, the force created by the bias 108 is overcome and the piston member 84 moves in a downstream direction, i.e., to the right as illustrated in FIGURES 1, 3, and 4 of the drawing, so that the surface 106 is not in engagement with the O-ring member 104 and a space or clearance 110, note FIGURE 4 of the drawing, is created between the piston head end member 96 and the adjacent end portion of the piston rod end sleeve 76 with the space or clearance 110 being in communication with the recess 100 by reason of the movement of the piston member 84 which in turn places the space or clearance 98 in communication with the recess 82 through the space or clearance 110, the recess 100 and the passageways 80. Communication of the clearances 98 and 110 with the recesses 100 and 82 results in equalization of hydraulic fluid pressure on both sides of the O-ring 104 allowing same to release and contract back into the annular recess 102.

The operating cycle of the system and the apparatus 10 which creates a resilient spring-like suspension or support for a vehicle or other similar structure will now be described and disclosed. After the upper mount 38 is attached to a vehicle frame, not illustrated, and the lower mount 40 is connected to a vehicle axle housing, also not illustrated, it is believed to be obvious that as a load on such vehicle is increased, the apparatus 10 is compressed with the effective overall length thereof being decreased in accordance with and in response to the amount of increase in the vehicle load, and the piston rod 30 and the piston head 32 tend to move inwardly into the inner tube-like member 20 toward the lower cap element 16 and the lower mount 40, i.e., to the right as illustrated in FIGURE 1 of the drawing. The high pressure fluid PF, during the intake phase of the closed circuit fluid flow, is fed through the intake port 56 from a suitable high pressure pump and if desirable, an accummulator, not illustrated, to establish a high pressure chamber 112 within the hollow of the piston rod 30 to the upstream side of the piston head 32. In actual practice, it has been found advantageous to have the pressure fluid PF under pressure on the order of 1000 p.s.i. in the pressure chamber 112.

From the high pressure chamber 112 the high pressure fluid PF passes to the working phase of the closed circuit by flowing through the piston head 32 in the variable space or clearance 86 which is between the tapering surface 72 on the intermediate portion 48 of the metering rod 44 and the smooth bore 50 in the piston rod end sleeve 76 into a pressure chamber 114 defined by the opening in the inner tube-like member 20 and the lower end cap element 16 to the downstream side of the piston head 32 and then from the pressure chamber 114 the high pressure fluid PF flows through the openings 60 and the anti-extrusion valves 64 in the inner tube-like member 20 into the pressure chamber 28. As explained above, the space or clearance 86 varies in size depending upon the position of the piston head 32 and piston rod end sleeve 76 relative to the metering rod 44 so that the volume and pressure of the high pressure fluid PF may be varied between the intake and the working phases of the closed circuit.

It is to be noted that there is no other outlet or inlet for the pressure chamber 28 other than that which is created by the openings 60 and the anti-extrusion valves 64. The pressure chambers 112, 114, and 28 are obviously filled with the high pressure fluid PF at all times and since the high pressure fluid PF is being continuously fed through the intake port 56, there must be a continuous discharge flow path for the high pressure fluid PF during the operating cycle of the system and the apparatus 10.

The discharge flow path of the high pressure fluid PF during the exhaust phase of the closed circuit is from the pressure chamber 114 past the piston head end member 96 through the space or clearance 98 directly to the recess 82 and past the O-ring member 104 into the space or clearance 110 through the recess 100 into the passageways 80, then into the recess 82 and thence into the variable space or clearance 90 between the tapered wall portion of the inner tube-like member 20 and the piston rod 30 to the exhaust port 58 in the intermediate cap element 18 since the high pressure fluid PF which is within the confines of the pressure chamber 112 will be acting on the upstream end portion of the piston rod end sleeve 76 in a manner which will overcome the force of the bias 108 and urge the piston rod end sleeve 76 in a downstream direction, i.e., to the right as illustrated in FIGURES 1, 3, and 4 of the drawing, so that the surface 106 will disengage the deformable O-ring member 104 and place the passageways 80 in communication with the space or clearance 98 and the pressure chamber 114 through the recess 100 and the space or clearance 110. In passing, it is to be noted that depending upon the relative positioning of the piston rod 30 and the flared portion of the inner tube-like member 20 that the space or clearance 90 will be varied to vary the volume and pressure of the high pressure fluid PF while passing from the working phase to the exhaust phase of the closed circuit.

With the arrangement of the apparatus 10 being as described and disclosed above, consider an unloaded condition of a vehicle wherein the normal position of the apparatus 10 is such that the piston rod 30 is located as illustrated in FIGURE 1 of the drawing which is intended to be the normal condition and position of the apparatus 10 when a vehicle is in an unloaded condition. As the vehicle is loaded or as a load on the vehicle is increased, the piston rod 30 is urged in a downstream direction through the inner tube-like member 20 toward the lower end cap element 16, i.e., to the right of the apparatus 10 as illustrated in FIGURE 1 of the drawing, to thus increase the size of the variable space or clearance 86 which is between the tapering surface 72 on the intermediate portion 48 of the metering rod 44 and the constant bore 50 through the piston rod end sleeve 76 while simultaneously maintaining or decreasing the size of the variable space or clearance 90 which is between the flared end portion of the inner tube-like member 20 and the piston rod 30. Since the pressure and the inlet flow rate of the pressure fluid PF is increased while the discharge flow rate thereof is decreased or maintained constant, there will be more high pressure fluid PF retained in the pressure chambers 114 and 28 so that the piston rod 30 will eventually be urged toward the upper end cap element 34, i.e., toward the left of the apparatus 10 as viewed in FIGURE 1 of the drawing, until the piston rod 30 has been nearly returned to its normal position as illustrated in FIGURE 1 of the drawing. Under these conditions, the ratio of the volume of the high pressure fluid PF in the pressure chamber 28 relative to the volume of the compressible fluid F in the sealed chamber 26 is increased with a resulting increase in the operating pressures of the fluids F and PF which are within the chambers 26 and 28 respectively.

When the load is removed or decreased on the vehicle, the apparatus 10 will longitudinally extend due to the pressure of the compressible fluid F which is confined within the sealed chamber 26 which tends to urge the piston rod 30 to move outwardly and during such movement the variable space or clearance 86 which is between the tapering surface 72 on the metering rod 44 and the bore 50 in the piston head 32 will decrease or remain constant while increasing the variable space or clearance 90 between the piston rod 30 and the inner tube-like member 20. In the normal operating position of the apparatus 10, as illustrated in FIGURE 1 of the drawing, the piston rod 30 is positioned so that there is a controlled discharge flow rate of the high pressure fluid PF as well as a controlled intake flow rate which tends to maintain the piston rod 30 in the position illustrated in absence of any increase in the load being supported by a vehicle. When the apparatus 10 compensates for any increase in the load on a vehicle, the unit pressure of the high pressure fluid PF in the chamber 28 is considerably greater than a like unit pressure when such vehicle has a smaller load.

Considering the apparatus 10 in the static or shutdown condition, wherein the vehicle is idle, fluid under pressure would no longer flow through the intake port 56. This would result in a decrease in the pressure exerted by the fluid retained in the pressure chamber 112 by the action of the check valve 62. As the fluid pressure in pressure chamber 112 approaches the pressure exerted by the fluid in pressure chamber 114, the combined forces of the entrapped fluid F and PF and that of the bias 108 will cause the piston 84 to move in an upstream direction. This will result in a simultaneous sealing of the O-ring 104 to close off any discharge flow and an increase in the pressure of the fluid within the chamber 112 due to compression thereof by the piston 84 moving in the upstream direction. This will tend to equalize the pressures within the two pressure chambers 112 and 114 at which point the apparatus 10 is in the static or neutral condition. At this point, fluid will not flow from pressure chamber 114 to pressure chamber 112 since the pressure chamber 112 is of a constant volume and would already be filled with fluid. A relief valve shown at 115 in FIGURE 1, is provided in the upstream conduit 54 to function as a safety valve to prevent intermittent high pressures from destroying the apparatus 10 when the latter is in the static or neutral position.

The anti-extrusion valves 64 primarily function to prevent the extrusion of the diaphram 22 through the openings 60 and are not intended to function as completely leakless seals between the pressure chambers 28 and 114 to prevent fluid flow of the high pressure fluid PF therebetween but may merely retard the fluid flow of the high pressure fluid PF from the pressure chamber 28 back into the pressure chamber 114. In situations such as a sudden retraction or contraction of the apparatus 10 due to a vehicle going over a bump or the like, the anti-extrusion valves 64 may act as fluid damping means since the piston rod 30 will momentarily move inwardly into the inner tube-like member 20 to further compress the entrapped fluids F and PF thus giving a resilient spring-like action to the entrapped fluids F and PF by checking the return flow of the high pressure fluid PF from the pressure chamber 28 to the pressure chamber 114.

While the invention has been described, disclosed and illustrated in terms and forms of the embodiments or modifications which it has assumed in practice, the scope of the invention should not be deemed to be limited by these precise embodiments or modifications herein shown, illustrated, described and disclosed, and it is to be understood that other such embodiments or modifications are intended to be reserved especially as they fall within the scope of the claims herein subjoined.

I claim as my invention:

1. In a closed circuit type suspension system for supporting a vehicle wherein said system is provided with a compressible fluid restrained within the confines of a sealed chamber and a high pressure fluid which passes through a closed circuit which is provided with intake, working, and exhaust phases, apparatus including a piston rod having a piston head mounted for reciprocating movement within the confines of a tube-like member and a flexible impervious diaphragm disposed intermediate the sealed chamber and the working phase of the closed circuit, and means for varying the volume of the high pressure fluid during the flow thereof through the closed circuit during the operating cycle of the system and for defining a seal against the high pressure fluid flow through the closed circuit during a static condition of the system, said means including an elongated metering rod disposed within the confines of the apparatus and passing through a bore in the piston head with the end portions of the metering rod terminating on opposed sides of the piston head, said metering rod and said bore in the piston head each having a surface one of which has a substantially constant cross sectional area while the other is tapered in converging relationship to define a variable clearance between the metering rod and the piston head bore to place the intake phase of the closed circuit in communication with the working phase thereof, said means further including the surface of the tube-like member which extends from substantially the longitudinal mid-point thereof, said surface of the tube-like member diverging from the longitudinal mid-point thereof away from the adjacent surface of the piston rod and defining therewith a variable space for placing the working phase of the closed circuit in communication with the exhaust phase thereof, said means also including a device carried by the piston head for placing the exhaust phase of the closed circuit in communication with the working phase thereof during the operating cycle of the system and for sealing the exhaust phase of the closed circuit from the working phase thereof during a static condition of the system, said device including a piston sleeve secured to the piston rod, said piston sleeve having a bore extending generally axially therethrough and conduit means for placing the exhaust phase of the closed circuit in communication with the working phase thereof, an elongated piston member slidably mounted within the bore of the piston sleeve for movement relative to the piston sleeve, said piston member extending through the bore in the piston sleeve and terminating in enlarged end portions with a first end portion having a configuration which creates a clearance between the piston member and the tube-like member, deformable sealing structure disposed between the piston sleeve and the piston member, said sealing structure being deformable on engagement by said first end portion of the piston member to close the clearance between the piston member and the tube-like member, and a bias means disposed between a second end portion of the piston member and the piston sleeve for normally urging the piston member in a direction to deform the sealing structure and seal the exhaust phase of the closed circuit from the working phase thereof during a static condition of the system, said second end portion of the piston member having a configuration to define a surface against which the high pressure fluid may act to overcome the force of said bias means, whereby the piston member is disengaged from the sealing structure and the exhaust phase of the closed circuit is placed in communication with the working phase thereof through the clearance between the first end portion of the piston member and the tube-like member and the conduit means in the piston sleeve during the operating cycle of the system.

2. In a closed circuit type suspension system for supporting a structure wherein said system is provided with a compressible fluid restrained within the confines of a sealed chamber and a high pressure fluid which passes through a closed circuit which is provided with intake, working, and exhaust phases, apparatus including a piston rod having a piston head mounted for reciprocating movement within the confines of a tube-like member and a flexible impervious diaphragm disposed intermediate the sealed chamber and the working phase of the closed circuit, and means for varying the volume of the high pressure fluid during the flow thereof through the closed circuit during the operating cycle of the system, said means including an elongated metering rod disposed within the confines of the apparatus and passing through a bore opening in the piston head with the end portions of the metering rod terminating on opposed sides of the piston head, said metering rod and said bore in the piston head each having a surface one of which has a substantially constant cross sectional area while the other is tapered in converging relationship to define a variable clearance between the metering rod and the piston head bore to place the intake phase of the closed circuit in communication with the working phase thereof, said means further including the surface of the tube-like member which extends from substantially the longitudinal mid-point of said tube-like member in a direction toward one end of said tube-like member, said surface of the tube-like member diverging from the longitudinal mid-point thereof away from the adjacent part of the piston rod and defining therewith a variable space for placing the working phase of the closed circuit in communication with the exhaust phase thereof.

3. In a closed circuit type suspension system for supporting a structure wherein said system is provided with a compressible fluid restrained within the confines of a sealed chamber and a high pressure fluid which passes through a closed circuit which is provided with intake, working, and exhaust phases, apparatus including a piston rod having a piston head mounted for reciprocating movement within the confines of a tube-like member and a flexible impervious diaphragm disposed intermediate the sealed chamber and the working phase of the closed circuit, and means for varying the rate of high pressure fluid flow between the intake phase and the working phase of the closed circuit during the operational cycle of the system, said means including an elongated metering rod disposed within the confines of the apparatus and passing through a bore in the piston head with the end portions of the metering rod terminating on opposed sides of the piston head, said metering rod and said bore in the piston head each having a surface of one of which has a substantially constant cross sectional area while the other is tapered in converging relationship to define a variable clearance between the metering rod and the piston head bore to place the intake phase of the closed circuit in communication with the working phase thereof, means for varying the flow rate of the high pressure fluid between the working and exhaust phases in the closed circuit, and means for sealing the fluid flow of the high pressure fluid during a static condition of the apparatus.

4. The structure as set forth in claim 3,
wherein said bore in the piston head is provided with the one surface having the substantially constant cross sectional area while the intermediate portion of the metering rod is provided with the other surface which is tapered in the converging relationship.

5. The structure as set forth in claim 3,
wherein said clearance may vary from a minimum of approximately .001 inch to a maximum of approximately .005 inch.

6. The structure as set forth in claim 3,
wherein the intermediate portion of the metering rod is approximately 2 inches in length and is tapered from a first location thereon toward a second location, with said metering rod having a diameter of approximately .125 inch at said first location and a diameter of about .120 inch at said second location.

7. In a closed circuit type suspension system for supporting a structure wherein said system is provided with a compressible fluid restrained within the confines of a sealed chamber and a high pressure fluid which passes through a closed circuit which is provided with intake, working, and exhaust phases, apparatus including a piston rod having a piston head mounted for reciprocating movement within the confines of a tube-like member and a flexible impervious diaphragm disposed intermediate the sealed chamber and the working phase of the closed circuit, and means for varying the volume of the high pressure fluid during the flow thereof through the closed circuit during the operating cycle of the system, said means including that surface of the tube-like member which extends from substantially the longitudinal mid-point thereof, said surface of the tube-like member diverging from the longitudinal midpoint thereof away from the adjacent surface of the piston rod and defining therewith a variable space for placing the working phase of the closed circuit in communication with the exhaust phase thereof.

8. In a closed circuit type suspension system for supporting a structure wherein said system is provided with a compressible fluid restrained within the confines of a sealed chamber and a high pressure fluid which passes through a closed circuit which is provided with intake, working, and exhaust phases, apparatus including a piston rod having a piston head mounted for reciprocating movement within the confines of a tube-like member and a flexible impervious diaphragm disposed intermediate the sealed chamber and the working phase of the closed circuit, and means for defining a seal against the high pressure fluid flow through the closed circuit during a static condition of the system, said means including a piston sleeve secured to the piston rod, said piston sleeve having a bore extending generally axially therethrough and conduit means for placing the exhaust phase of the closed circuit in communication with the working phase thereof, an elongated piston member slidably mounted within the bore of the piston sleeve for movement relative to the piston sleeve, said piston member extending through the bore in the piston sleeve and terminating in enlarged end portions, a first end portion having a configuration which creates a clearance between the piston member and the tube-like member, deformable sealing structure disposed between the piston sleeve and the piston member, said sealing structure being deformable on engagement by said first end portion of the piston member to close the clearance between the piston member and the tube-like member, and a bias means disposed between a second end portion of the piston member and the piston sleeve for normally urging the piston member in a direction to deform the sealing structure and seal the exhaust phase of the closed circuit from the working phase thereof during a static condition of the system, said second end portion of the piston member having a configuration to define a surface against which the high pressure fluid may act to overcome the force of said bias means and disengage said first end portion of the piston member from the sealing structure and place the exhaust phase of the closed circuit in communication with the working phase thereof through the clearance between said first end portion of the piston member and the tube-like member and the conduit means in the piston sleeve during the operating cycle of the system.

9. In a closed circuit type suspension system for supporting a structure wherein said system is provided with a compressible fluid restrained within the confines of a sealed chamber and a high pressure fluid which passes through a closed circuit which is provided with intake, working, and exhaust phases, apparatus including a piston rod having a piston head mounted for reciprocating movement within the confines of a tube-like member and a flexible impervious diaphragm disposed intermediate the sealed chamber and the working phase of the closed circuit, and a first means for varying the inlet flow rate of the high pressure fluid flow in the closed circuit according to the position of the piston head to vary the volume of the high presure fluid which may act on the compressible fluid during the operating cycle of the apparatus, a second means for defining a seal against the high pressure fluid flow through the closed circuit during a static condition of the system, said second means including means carried by the piston head for placing the exhaust phase of the closed circuit in communication with the working phase during the operating cycle of the system and for sealing the exhaust phase of the closed circuit from the working phase during a static condition of the system and means for varying the flow rate of the high pressure fluid between the working phase and the exhaust phase in the closed circuit.

10. In a closed circuit type suspension system for supporting a structure wherein said system is provided with a compressible fluid confined within a sealed chamber and a high pressure fluid flows through a closed circuit which is provided with intake, working, and exhaust phases, apparatus for varying the volume of the high pressure fluid during the flow thereof through the closed circuit during the operating cycle of the system and for defining a seal against the high pressure fluid flow through the closed circuit during a static condition of the system, said apparatus having means including a plurality of spaced surfaces, some of which are tapered relative to others to define variable clearances therebetween through which said high pressure fluid flows in the closed circuit with said clearances being variable in response to the conditions imposed upon said system, one of said variable clearances being disposed intermediate the intake and the working phases of the closed circuit with another one of said variable clearances being disposed intermediate the working and the exhaust phases of the closed circuit, said means further including a device for placing the exhaust phase of the closed circuit in variable communication with the working phase thereof during the operating cycle of the system and including means for sealing the exhaust phase of the closed circuit from the working phase thereof during a static condition of the system.

11. In a closed circuit type suspension system for supporting a structure wherein said system is provided with a compressible fluid confined within a sealed chamber and a high pressure fluid flows through a closed circuit which is provided with intake, working, and exhaust phases, apparatus for varying the volume of the high pressure fluid during the flow thereof through the closed circuit during the operating cycle of the system and for defining a seal against the high pressure fluid flow through the closed circuit during a static condition of the system, said apparatus having means including a plurality of spaced surfaces, some of which are tapered relative to others to define variable clearances therebetween through which said high pressure fluid flows in the closed circuit with said clearances being variable in response to the conditions imposed upon said system, and a device for placing the exhaust phase of the closed circuit in variable communication with the working phase thereof during the operating cycle of the system and including means for sealing the exhaust phase of the closed circuit from the working phase thereof during a static condition of the system.

12. In a closed circuit type suspension system for supporting a structure wherein said system is provided with a compressible fluid confined within a sealed chamber and a high pressure fluid flows through a closed circuit which is provided with intake, working, and exhaust phases, apparatus for varying the volume of the high pressure fluid during the flow thereof through the closed circuit during the operating cycle of the system, said apparatus having means including a plurality of spaced surfaces, some of which are tapered relative to others to define variable clearances therebetween through which said high pressure fluid flows in the closed circuit with said clearances being variable in response to the conditions imposed upon said system, one of said variable clearances being disposed intermediate the intake and the working phases of the closed circuit with another one of said variable clearances being disposed intermediate the working and the exhaust phases of the closed circuit.

13. In a closed circuit type suspension system for supporting a structure wherein said system is provided with a compressible fluid confined within a sealed chamber and a high pressure fluid flows through a closed circuit which is provided intake, working, and exhaust phases, apparatus for varying the volume of the high pressure fluid during the flow thereof through the closed circuit during the operating cycle of the system, said apparatus having means operatively associated with said intake, working, and exhaust phases, including a plurality of spaced surfaces, some of which are tapered relative to others to define variable clearances therebetween through which said high pressure fluid flows in the closed circuit with said clearances being variable in response to the conditions imposed upon said system, and means for defining a seal against the high pressure fluid flow through the closed circuit during a static condition of the system and means including a device carried by the piston head for placing the exhaust phase of the closed circuit in communication with the working phase thereof during the operating cycle of the system and for sealing the exhaust phase of the closed circuit from the working phase thereof during a static condition of the system.

14. An elongated longitudinally extensible and retractable apparatus for suspending a vehicle, said apparatus including a housing assembly defining substantially concentrically disposed inner and outer chamber having a resilient substantially impervious diaphragm positioned therebetween, said outer chamber being sealed and having a compressible fluid confined therein, said inner chamber having valved controlled apertures for receiving variable volumes of high pressure fluid from a flow path of a closed circuit system having intake, working, and exhaust phases, a hollow piston rod having a piston head mounted for reciprocating movement within the confines of said housing assembly, and means for varying the volume of high pressure fluid flow between the intake and the working phases of the closed circuit and for varying the amount of fluid flow between the working and discharge phases of the closed circuit during the operating cycle thereof and for sealing the high pressure fluid flow between the working and the exhaust phases of the closed circuit during a static condition of the apparatus, said means including an elongated metering rod disposed within the confines of the hollow of the piston rod and passing through a bore in the piston head with the end portions of the metering rod terminating on opposed sides of the piston head, said metering rod and said bore in the piston head each having a surface, one of which has a substantially constant cross sectional area while the other is tapered in converging relationship, to define a variable clearance between the metering rod and the piston head bore to place the intake phase of the closed circuit in communication with the working phase thereof, said means further including that surface of the tube-like member which extends from substantially the longitudinal midpoint thereof, said surface of the tube-like member diverging from the longitudinal midpoint thereof away from the adjacent surface of the piston rod and defining therewith a variable space for placing the working phase of the closed circuit in communication with the exhaust phase thereof, and a device including a piston sleeve secured to the piston rod, said piston sleeve having a bore extending generally axially therethrough and conduit means for placing the exhaust phase of the closed circuit in communication with the working phase thereof, an elongated piston member slidably mounted within the bore of the piston sleeve for movement relative to the piston therefor, said piston member extending through the piston sleeve and terminating in enlarged end portions with a first end portion having a configuration which creates a clearance between the piston member and the tube-like member, deformable sealing structure disposed between the piston sleeve and the piston member, said sealing structure being deformable on engagement by said first end portion of the piston member to close the clearance between the piston member and the tube-like member, and a bias means disposed between a second end portion of the piston member and the piston sleeve for normally urging the piston member in a direction to deform the sealing structure and seal the exhaust phase of the closed circuit from the working phase thereof during a static condition, said second end portion of the piston member having a configuration to define a surface against which the high pressure fluid may act to overcome the force of said bias means and disengage said first and portion of the piston member from the sealing structure and place the exhaust phase of the closed circuit in communication with the working phase thereof through the clearance between said first end portion of the piston member and the tube-like member and the conduit means in the piston sleeve during the operating cycle of the apparatus.

15. An elongated longitudinally extensible and retractable apparatus for suspending a structure, said apparatus including a housing assembly defining substantially concentrically disposed inner and outer chambers having a resilient substantially impervious diaphragm positioned therebetween, said outer chamber being sealed and having a compressible fluid confined therein, said inner chamber having valved controlled apertures for receiving variable volumes of high pressure fluid from a flow path of a closed circuit system having intake, working, and exhaust phases, a piston rod having a piston head mounted for reciprocating movement within the confines of said housing assembly, and means for varying the volume of high pressure fluid flow between the intake and the working phases of the closed circuit and for varying the amount of fluid flow between the working and discharge phases of the closed circuit during the operating cycle thereof, said means including an elongated metering rod disposed within the confines of the apparatus and passing through a bore in the piston head with the end portions of the metering rod and said bore in the piston head each having a surface, one of which has a substantially constant cross sectional area while the other is tapered in converging relationship to define a variable clearance between the metering rod and the piston head bore to place the intake phase of the closed circuit in variable communication with the working phase thereof, said means further including that surface of the tube-like member which extends from substantially the longitudinal midpoint thereof, said surface of the tube-like member diverging from the longitudinal midpoint thereof away from the adjacent surface of the piston rod and defining therewith a variable space, adapted to regulate the flow of fluids therethrough, and for placing the working phase of the closed circuit in communication with the exhaust phase thereof.

16. An elongated longitudinally extensible and retractable apparatus for suspending a structure, said apparatus including a housing assembly defining substantially concentrically disposed inner and outer chambers having a resilient substantially impervious diaphragm positioned therebetween, said outer chamber being sealed and having a compressible fluid confined therein, said inner chamber having valved controlled apertures for receiving variable volumes of high pressure fluid from a flow path of a closed circuit system having intake, working, and exhaust phases, a piston rod having a piston head mounted for reciprocating movement within the confines of said housing assembly, and means for varying the volume of high pressure fluid flow between the intake and the working phases of the closed circuit and for varying the amount of fluid flow between the working and discharge phases of the closed circuit during the operating cycle thereof, said means including that surface of the tube-like member which extends from substantially the longitudinal midpoint thereof, said surface of the tube-like member diverging from the longitudinal midpoint thereof away from the adjacent surface of the piston rod and defining therewith a variable space for placing the working phase of the closed circuit in communication with the exhaust phase thereof.

17. An elongated longitudinally extensible and retractable apparatus for suspending a structure, said apparatus including a housing assembly defining substantially concentrically disposed inner and outer chambers having a resilient substantally impervious diaphragm positioned therebetween, said outer chamber being sealed and having a compressible fluid confined therein, said inner chamber having valved controlled apertures for receiving variable volumes of high pressure fluid from a flow path of a closed circuit system having intake, working, and exhaust phases, a piston rod having a piston head mounted for reciprocating movement within the confines of said housing assembly, and means for varying the volume of high pressure fluid flow between the intake and the working phases of the closed circuit during the operating cycle thereof, said means including an elongated metering rod disposed within the confines of the apparatus and passing through a bore in the piston head with the end portions of the metering rod terminating on opposed sides of the piston head, said metering rod and said bore in the piston head each having a surface, one of which has a substantially constant cross sectional area while the other is tapered in converging relationship to define a variable clearance between the metering rod and the piston head bore to place the intake phase of the closed circuit in communication with the working phase thereof, and means for varying the discharge flow rate of the high pressure fluid flow in the closed circuit between the working phase and the exhaust phase during the operating cycle thereof, and means for sealing the fluid flow of the high pressure fluid between the working phase and the exhaust phase of the closed circuit during a static condition of the apparatus.

18. The apparatus as set forth in claim 17, wherein said bore in the piston head is provided with the one surface having the substantially constant cross sectional area while the intermediate portion of the metering rod is provided with the other surface which is tapered in the converging relationship.

19. The apparatus as set forth in claim 17, wherein said clearance may vary from a minimum of approximately .001 inch to a maximum of approximately .005 inch.

20. The apparatus as set forth in claim 19, wherein the intermediate portion of the metering rod is approximately 2 inches in length and is tapered from a first location thereon toward a second location with said metering rod having a diameter of approximately .125 inch at said first location and a diameter of about .120 inch at said second location.

21. An elongated longitudinally extensible and retractable apparatus for suspending a structure,
said apparatus including a housing assembly defining substantially concentrically disposed inner and outer chambers having a resilient substantially imprevious diaphragm positioned therebetween,
said outer chamber being sealed and having a compressible fluid confined therein,
said inner chamber having valved controlled apertures for receiving variable volumes of high pressure fluid from a flow path of a closed circuit system having intake, working, and exhaust phases,
a piston rod having a piston head mounted for reciprocating movement within the confines of said housing assembly, and
means for sealing the high pressure fluid flow between the intake and working phase of the closed circuit during a static condition of the apparatus,
said means including a piston sleeve secured to the piston rod,
said piston sleeve having a bore extending generally axially therethrough and conduit means for placing the exhaust phase of the closed circuit in communication with the working phase thereof,
an elongated piston member slidably mounted within the bore of the piston sleeve for movement relative to the piston sleeve,
said piston member extending through the piston sleeve and terminating in enlarged end portions with a first end portion having a configuration which creates a clearance between the piston member and the tube-like member,
deformable sealing structure disposed between the piston sleeve and the piston member, said sealing structure being deformable on engagement by said first end portion of the piston member to close the clearance between the piston member and the tube-like member, and
a bias means disposed between a second end portion of the piston member and the piston sleeve for normally urging the piston member in a direction to deform the sealing structure and seal the exhaust phase of the closed circuit from the working phase thereof during a static condition,
said second end portion of the piston member having a configuration to define a surface against which the high pressure fluid may act to overcome the force of said bias means and disengage said first end portion of the piston member from the sealing structure and place the exhaust phase of the closed circuit in communication with the working phase thereof through the clearance between said first end portion of the piston member and the tube-like member and the conduit means in the piston sleeve during the operating cycle of the apparatus.

22. An elongated longitudinally extensible and retractable apparatus for suspending a structure,
said apparatus including a housing assembly defining substantially concentrically disposed inner and outer chambers having a resilient substantially imprevious diaphragm positioned therebetween,
said outer chamber being sealed and having a compressible fluid confined therein,
said inner chamber having valved controlled apertures for receiving variable volumes of high pressure fluid from a flow path of a closed circuit system having intake, working, and exhaust phases, and a first means for varying the volume of high pressure fluid flow between the intake phase and the working phase of the closed circuit, a second means for varying the amount of fluid flow between the working phase and the exhaust phase of the closed circuit during the operating cycle thereof, and means for sealing the high pressure fluid flow between the working and the exhaust phases of the closed circuit during a static condition of the apparatus.

23. An extensible and contractible apparatus for suspending a structure,
said apparatus having a plurality of chambers,
one of said chambers being sealed and having a compressible fluid confined therein,
another of said chambers being in communication with a high pressure fluid having a closed circuit fluid flow through intake, working, and exhaust phases in the apparatus,
a resilient substantially impervious diaphragm disposed between the one and the another chamber,
a movable member responsive to the suspension of such structure acting on the fluid flow of the high pressure fluid, and a first means for varying the inlet flow rate of the high pressure fluid flow in the closed circuit according to the position of the member to vary the volume of the high pressure fluid which may act on the compressible fluid during the operating cycle of the apparatus, a second means for varying the flow rate of the high pressure fluid disposed between the working phase and the exhaust phase in the closed circuit according to the position of the member, and means for sealing the fluid flow of the high pressure fluid during a static condition of the apparatus.

24. An extensible and contractible apparatus for suspending a structure,
said apparatus having a plurality of chambers,
one of said chambers being sealed and having a quantity of compressible fluid including Freon 14 confined therein,
another of said chambers being in communication with a high pressure fluid oil having a closed circuit fluid flow through the apparatus,
a neoprene diaphragm disposed between the one and the another chamber, and
means for varying the inlet and exhaust flow rate of the high pressure fluid oil through the closed circuit to vary the volume of the high pressure fluid oil which may act on the compressible fluid during the operating cycle of the apparatus.

References Cited by the Examiner

UNITED STATES PATENTS

| | | | |
|---|---|---|---|
| 1,861,821 | 6/32 | Schaum | 280—124 X |
| 2,053,053 | 9/36 | Swalm | 267—64 |
| 2,532,143 | 11/50 | Breit | 138—30 |
| 2,570,362 | 10/51 | Mercier | 267—64 |
| 2,595,239 | 5/52 | Gay | 267—64 |
| 2,673,733 | 5/54 | Fitz John | 267—65 |
| 2,823,915 | 2/58 | Bourcier de Carbon | 267—64 X |
| 2,999,680 | 9/61 | Eiseman | 267—64 |
| 3,034,605 | 5/62 | Pernini | 267—1 |
| 3,057,768 | 10/62 | McGough | 267—65 X |
| 3,088,726 | 5/63 | Dangauthier | 267—64 |

FOREIGN PATENTS

| | | |
|---|---|---|
| 845,721 | 8/39 | France. |
| 623,257 | 11/35 | Germany. |
| 849,342 | 9/60 | Great Britain. |
| 442,827 | 10/47 | Italy. |

ARTHUR L. LA POINT, *Primary Examiner.*

UNITED STATES PATENT OFFICE
CERTIFICATE OF CORRECTION

Patent No. 3,206,185                              September 14, 1965

Sidney Oldberg

It is hereby certified that error appears in the above numbered patent requiring correction and that the said Letters Patent should read as corrected below.

Column 1, lines 25 and 38, for "exhause", each occurrence, read -- exhaust --; column 3, line 35, for "appartus" read -- apparatus --; line 55, for "reslient" read -- resilient --; column 4, line 7 for "his" read -- this --; column 15, line 70, after "provided" insert -- with --; column 16, line 69, for "therefor" read -- sleeve --; column 17, line 15, for "and", second occurrence, read -- end --; column 18, line 25, for "substantally" read -- substantially --.

Signed and sealed this 7th day of June 1966.

(SEAL)

Attest:

ERNEST W. SWIDER
Attesting Officer

EDWARD J. BRENNER
Commissioner of Patents